US007477190B2

(12) United States Patent
Bang et al.

(10) Patent No.: US 7,477,190 B2
(45) Date of Patent: Jan. 13, 2009

(54) SMART ANTENNA BEAMFORMING DEVICE IN COMMUNICATION SYSTEM AND METHOD THEREOF

(75) Inventors: Young-Jo Bang, Daejeo (KR); Young Ho Yun, Jeongeup (KR); Chang-Wahn Yu, Daejeon (KR); Hyung Rae Park, Goyang (KR); Youn-Ok Park, Daejeon (KR)

(73) Assignees: Samsung Electronics Co., Ltd. (KR); Electronics and Telecommunications Research Institute (KR); KT Corporation (KR); SK Telecom Co., Ltd. (KR); Hanaro Telecom, Inc. (KR)

( * ) Notice: Subject to any disclaimer, the term of this patent is extended or adjusted under 35 U.S.C. 154(b) by 0 days.

(21) Appl. No.: 11/607,270

(22) Filed: Dec. 1, 2006

(65) Prior Publication Data

US 2007/0164902 A1 Jul. 19, 2007

(30) Foreign Application Priority Data

Dec. 2, 2005 (KR) ...................... 10-2005-0116882

(51) Int. Cl.
*H01Q 3/00* (2006.01)
*G01S 7/36* (2006.01)
*H04J 1/00* (2006.01)

(52) U.S. Cl. .................... 342/377; 342/16; 370/343
(58) Field of Classification Search ..............................
342/357.01–357.17, 347, 377
See application file for complete search history.

(56) References Cited

U.S. PATENT DOCUMENTS

| | | | | |
|---|---|---|---|---|
| 6,075,484 A | * | 6/2000 | Daniel et al. | ................ 342/372 |
| 6,795,424 B1 | * | 9/2004 | Kapoor et al. | ............. 370/343 |
| 6,930,637 B2 | * | 8/2005 | Brothers et al. | ............. 342/427 |
| 2003/0085832 A1 | * | 5/2003 | Yu | .............................. 342/16 |

FOREIGN PATENT DOCUMENTS

| KR | 100322000 | 1/2002 |
|---|---|---|
| KR | 10-2005-0067335 | 7/2005 |
| KR | 10-2005-0106657 | 11/2005 |

* cited by examiner

*Primary Examiner*—Thomas H Tarcza
*Assistant Examiner*—Harry Liu
(74) *Attorney, Agent, or Firm*—The Farrell Law Firm, PC

(57) ABSTRACT

A beamforming device includes a Direction Of Arrival (DOA) estimation unit for estimating DOAs of the received signals based on a data subcarrier matrix; a pre-spatial filtering unit for using the estimated DOA, performing a filtering operation for the data subcarrier matrix, and generating filtering matrixes; a signal identification unit for using a data sequence, identifying original and interference signals, and generating the DOAs of the original and interference signals; a spatial filtering unit for generating an interference-plus-noise covariance matrix by using the DOA of the interference signal, eliminating the interference signal by using the covariance matrix and the DOA of the original signal, and forming final beams for the original signal; and a channel estimating and signal combining unit for performing a maximal ratio combining operation so that the final beams are combined as one combined final beam.

12 Claims, 6 Drawing Sheets

SMART ANTENNA BEAMFORMING DEVICE IN COMMUNICATION SYSTEM AND METHOD THEREOF

PRIORITY

This application claims priority under 35 U.S.C. § 119 to Korean Patent Application No. 10-2005-0116882 filed in the Korean Intellectual Property Office on Dec. 2, 2005, the contents of which are incorporated herein by reference.

BACKGROUND OF THE INVENTION

1. Field of the Invention

The present invention generally relates to a beamforming device for increasing a signal to interference ratio by using a direction-of-arrival estimation-based smart antenna process, and a method thereof.

2. Description of the Related Art

In general, in a mobile communication environment, a desired signal and an unwanted interference signal are received. A communication distortion rate by the interference signal is determined by a sum of a power level of the desired signal and power levels of other signals. Accordingly, when the level of the desired signal is much greater than the levels of the respective interference signals and the number of the interference signals is great, communication distortion may be caused since the power levels of the interference signals are increased. Accordingly, it is difficult to regenerate information of the desired signal due to the communication distortion.

To solve the above problem, an array antenna scheme has been developed in wireless communication systems. In particular, since a smart antenna system uses a plurality of array antenna elements, and controls a gain and a phase of signals received by the respective array antenna elements, a base station receives a signal transmitted from a desired user. In addition, a signal noise level by multiple access interference is greatly decreased, and therefor, system performance is improved, and channel capacity of the base station is increased.

Further, to eliminate the interference signal in an Orthogonal Frequency Division Multiplexing (OFDM) system, the entire antenna array is formed by two sub-arrays that are spaced sufficiently apart from each other, so that spatial diversity may be obtained. Then, an adaptive beamforming operation is performed for the respective sub-arrays, and the spatial diversity is obtained by using a maximal ratio combining.

However, in the above method, since a Direction Of Arrival (DOA) of a signal is estimated after the respective antenna elements perform coherent demodulation, when the base station receives the desired signal from various angles due to neighboring obstacles, it is difficult to separate the DOAs from various paths, and angular diversity may not be obtained. In addition, it is difficult to identify the desired signal and the interference signal by the base station, and it is difficult to combine the signals received from the various angles.

In another conventional method for eliminating an interference signal, a reference signal is transmitted in every subcarrier at a predetermined signal level to obtain a signal steering vector, steering vectors are generated for respective subcarriers to generate an optimum steering vector for every subcarrier, and therefore, an adaptive beam for a transmission signal may be formed. It is not required to estimate the DOA of the signal since the steering vector is estimated by transmitting the reference signal in every subcarrier, and therefore, a system is simplified, and a signal identification process is not required.

However, in the above method, since the reference signal is transmitted in every subcarrier, it takes a long time to estimate a covariance matrix of the received signal. In addition, in a Frequency Division Duplex (FDD) system, since center frequencies of transmission/reception signals are different from each other, the FDD system is not used to form the adaptive beam.

The above information is only for enhancement of understanding of the background of the invention, and therefore it may contain information that does not form prior art that is already known to one of ordinary skill in the art.

SUMMARY OF THE INVENTION

The present invention provides a smart antenna beamforming device for forming a beamforming vector for maximizing a signal to interference ratio by using an adaptive array antenna in a base station, and a method thereof.

According to one aspect of the present invention, in a beamforming method for forming a beam based on signals received through a plurality of antennas in a base station of a communication system, the method includes processing the plurality of signals to obtain a data subcarrier matrix allocated to at least one desired signal requested by the base station; estimating DOAs of the plurality of received signals based on the data subcarrier matrix; identifying the at least one desired signal and at least one interference signal from the plurality of signals based on the estimated DOA; generating an interference-plus-noise covariance matrix by using at least one DOA of the at least one interference signal among the DOAs; generating a plurality of beamforming vectors based on the covariance matrix; and using the plurality of beamforming vectors to form a plurality of final beams.

According to another aspect of the present invention, a base station beamforming device for forming a beam based on signals received through a plurality of antennas in a base station of a communication system includes a DOA estimation unit, a pre-spatial filtering unit, a signal identification unit, a spatial filtering unit, and a channel estimating and signal combining unit. The DOA estimation unit estimates DOAs of the plurality of received signals based on a data subcarrier matrix obtained from the plurality of received signals. The pre-spatial filtering unit uses the estimated DOA, performs a filtering operation for the data subcarrier matrix, and generates a plurality of filtering matrixes. The signal identification unit uses a data sequence generated by the plurality of filtering matrixes, identifies an original signal and an interference signal from the plurality of received signals, and generates the DOA of the original signal and the DOA of the interference signal. The spatial filtering unit generates an interference-plus-noise covariance matrix by using the DOA of the interference signal, eliminates the interference signal by using the covariance matrix and the DOA of the original signal, and forms a plurality of final beams for the original signal. The channel estimating and signal combining unit performs a maximal ratio combining operation so that the plurality of final beams are combined as one combined final beam.

According to another aspect of the present invention, a device for forming a beam includes means for estimating DOAs of a plurality of signals; means for identifying at least one original signal and at least one interference signal among the plurality of signals; means for identifying at least one first DOA of the at least one original signal and at least one second DOA of the at least one original signal among the DOAs; and means for forming at least one main beam in a direction of the at least desired signal by using the at least one first DOA and the at least one second DOA.

BRIEF DESCRIPTION OF THE DRAWINGS

The above and other objects, features and advantages of the present invention will become more apparent from the following detailed description when taken in conjunction with the accompanying drawings in which.

THE EMBODIMENT OF THE PRESENT INVENTION

Figure 1:
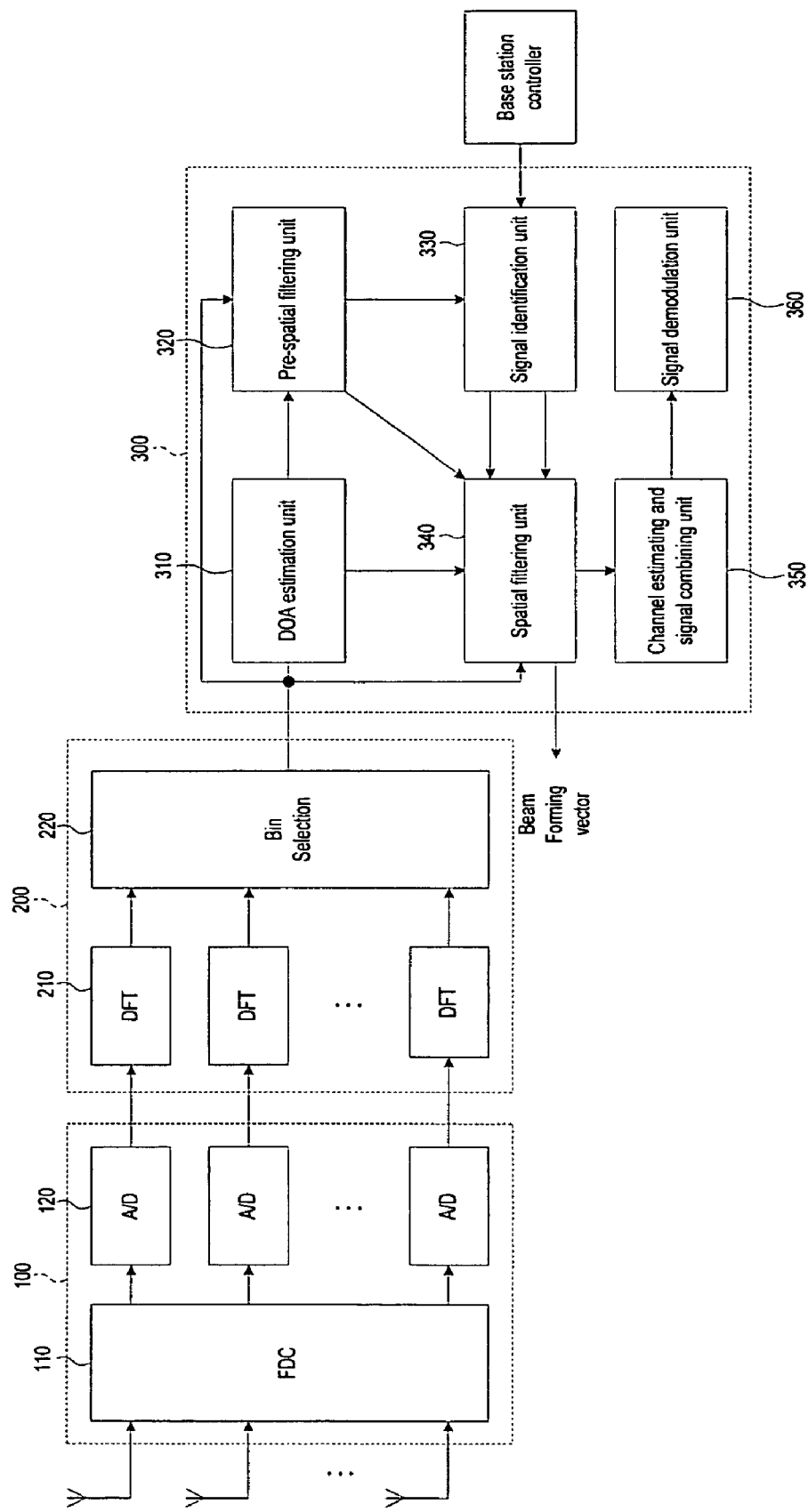
FIG. 1 shows a diagram of a configuration of a beamforming device for an OFDM mobile communication base station according to the present invention.

Preferred embodiments of the present invention will be described herein below with reference to the accompanying drawings. In the following description, well-known functions or constructions are not described in detail since they would obscure the invention in unnecessary detail. As those skilled in the art would realize, the described embodiments may be modified in various different ways, all without departing from the spirit or scope of the present invention. Accordingly, the drawings and description are to be regarded as illustrative in nature and not restrictive. Like reference numerals designate like elements throughout the specification.

Unless explicitly described to the contrary, the word "comprise" and variations such as "comprises" or "comprising" will be understood to imply the inclusion of stated elements but not the exclusion of any other elements.

A smart antenna scheme is classified into a plurality of schemes according to beamforming methods. A shape of a beam is determined based on weight values of various antennas, and the weight value is obtained by estimating a channel between a base station and a terminal. A method for estimating the channel may be classified into three methods, and in one Sample Matrix Inversion (SMI) method among the three methods, the weight value is calculated by using a covariance matrix of an input signal vector.

The SMI method is classified into two methods of a reference signal method and a Direction Of Arrival (DOA) estimation-based method. The DOA is an arrival direction of a beam defined by a pair of angles $\theta$ and $\phi$ that indicate arrival direction information of a received plane wave. $\theta$ denotes an angle between an incident direction of the plane wave and a z-axis, and $\phi$ denotes an angle between an x-axis and a vertical line from the incident direction of the plane wave to an x-y coordinate.

In general, signals are spread and received within a predetermined range. The DOA of a desired signal and the DOAs of a plurality of interference signals are estimated. According to an embodiment of the present invention, to form a main beam in a direction of the desired signal and to form a null in a direction of the interference signal, a process for identifying the desired signal and the interference signal and a process for estimating an interference-plus-noise covariance matrix are performed. In addition, when there are a plurality of DOAs of the desired signals, a process for efficiently combining the respective signals is performed.

According to the embodiment of the present invention, a DOA estimation-based SMI process is used, each DOA of the signals transmitted to the base station is estimated, the desired signal and the interference signal are identified, the estimated DOA of the interference signal is used to form an interference-plus-noise covariance matrix, and therefore, the interference signal may be efficiently eliminated.

An Orthogonal Frequency Division Multiplexing (OFDM) communication system is described for use in the embodiment of the present invention, but it is not limited thereto, and another communication system may be applied in the embodiment of the present invention.

FIG. 1 shows a beamforming device for an OFDM mobile communication base station according to the embodiment of the present invention. The beamforming device includes a baseband data sample generator 100, a Discrete Fourier Transform (DFT) unit 200, and a beamforming and processing unit 300.

The baseband data sample generator 100 includes a Frequency Down Conversion (FDC) unit 110 for down converting a radio frequency and an analog digital conversion unit 120, and the generator 100 transmits a Radio Frequency (RF) signal received from a plurality of antennas to a digital modem.

The FDC unit 110 uses a heterodyne method and a homodyne method. In the heterodyne method, the RF frequency is gradually converted to lower frequencies. The homodyne method is generally referred to as a direct frequency conversion method, and the RF frequency is directly converted to a baseband frequency in the homodyne method. Since the above two methods are well known to a person of an ordinary skill in the art, detailed descriptions thereof will be omitted. An analog signal of the low frequency converted by the FDC unit 110 is converted to a digital signal by the Analog to Digital converter (A/D) unit 120.

A baseband data sample, which is the digital signal of the low frequency that is converted by the baseband data sample generator 100, is input to the DFT unit 200. The DFT unit 200 includes a DFT unit 210 and a bin selection unit 220, and the DFT unit 200 performs a discrete Fourier transform operation for the baseband data sample of the signal received by m antenna elements to extract data of a subcarrier allocated to the desired signal.

The DFT unit 210 uses a Fourier transform equation to perform the discrete Fourier transform operation for the signal. That is, the DFT unit 210 is used to divide a band of the input signal, a digital realm method changed from a Fourier transform method is used to analyze a frequency in an analog realm, and a Fast Fourier Transform (FFT) method is used in an actual system.

When the baseband data sample is transmitted from the DFT unit 210 to the bin selection 220, the data of the subcarrier allocated to the desired signal by the base station are extracted.

The beamforming and processing unit 300 for forming and processing a beam by using the subcarrier data output from the DFT unit 200 includes a DOA estimation unit 310, a pre-spatial filtering unit 320, a signal identification unit 330, a spatial filtering unit 340, a channel estimating and signal combining unit 350, and a signal demodulation unit 360.

The DOA estimation unit 310 estimates a sample covariance matrix from the subcarrier data generated by the DFT unit 200. The DOA estimation unit 310 will be described with reference to FIG. 2. Throughout the specification, FIGS. 2 to 5 will be described with reference to FIG. 6. FIG. 6 shows a beamforming process in a base station of the OFDM communication system according to the embodiment of the present invention.

Figure 2:
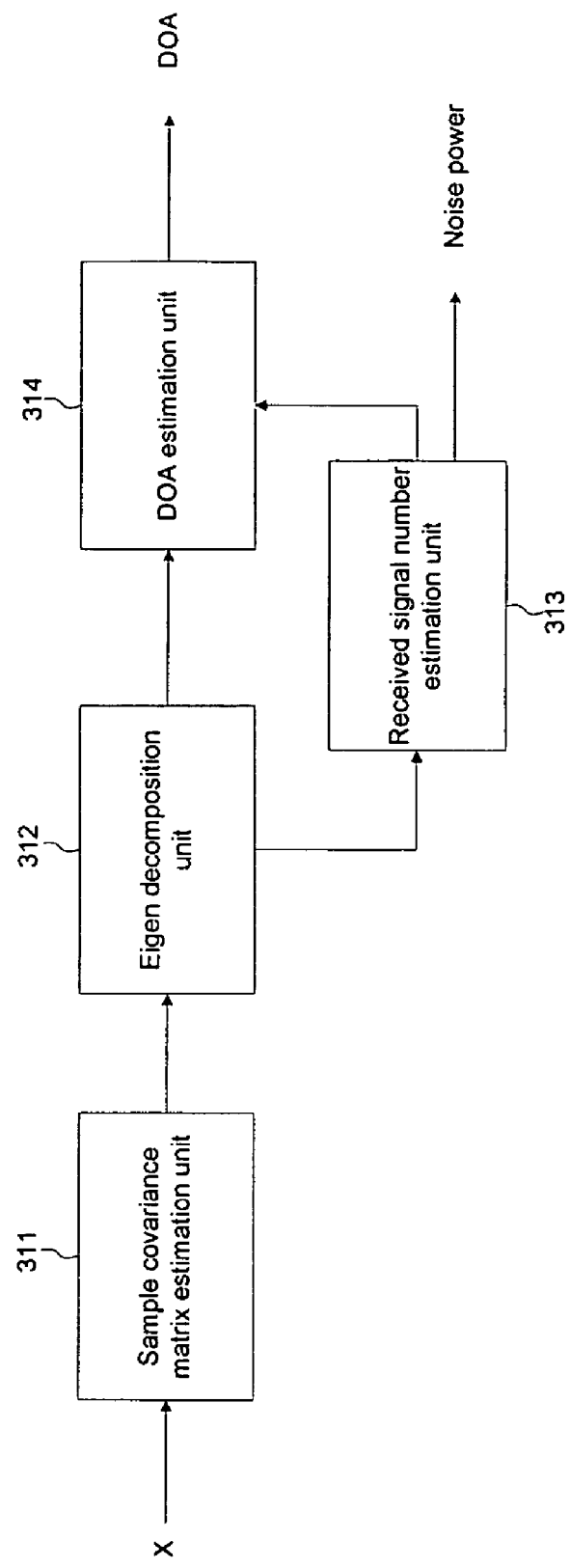
FIG. 2 shows a diagram of a configuration of a direction of arrival (DOA) estimation unit according to the present invention.

FIG. 2 shows a configuration of the DOA estimation unit 310 according to the embodiment of the present invention. The DOA estimation unit 310 includes a sample covariance matrix estimation unit 311, an Eigen decomposition unit 312, a DOA estimating unit 314, and a received signal number estimation unit 313.

The sample covariance matrix estimation unit 311 estimates a sample covariance matrix given as Equation (1) from a data subcarrier matrix X generated by the DFT unit 200, in step S100.

$$\hat{R}_x = \frac{1}{N_c M} \sum_{i=1}^{N} \sum_{k=1}^{N_c} x_k(i) x_k^H(i) \qquad (1)$$
$$= \frac{1}{N_c M} X X^H$$

$x_k(i)$ denotes a m×1 column vector including discrete Fourier transformed signals, k denotes a subcarrier index, and i denotes an OFDM symbol index. $N_c$ denotes the number of subcarriers allocated to the desired signal by the base station, and M denotes the number of the OFDM symbols. X denotes a (m×$N_c$M) matrix obtained by forming $x_k(i)$, which is NcM data obtained by an antenna element, as a row vector.

The Eigen decomposition unit 312 receiving the matrix $R_x$ estimated by the sample covariance matrix estimation unit 311 performs Eigen decomposition to obtain a combination including an eigenvalue λ and an eigenvector v. That is, λ is given as $\lambda_1, \lambda_2, \ldots,$ and $\lambda_m$ and v is given as $v_1, v_2, \ldots,$ and $v_m$. The eigenvalue λ is input to the received signal number estimation unit 313 to output a noise power value $\hat{\sigma}_n^2$ and the number d of DOAs. The number d of DOAs along with the eigenvector v is input to the DOA estimating unit 314 to estimate the DOA $\theta_1, \theta_2, \ldots,$ and $\theta_d$ in step S110, and the noise power value $\hat{\sigma}_n^2$ is used to calculate an interference-plus-noise covariance matrix.

To estimate the DOA in step S110, one among high resolution direction finding processes including a MUltiple SIgnal Classification (MUSIC), a root-MUSIC, and an Estimation of Signal Parameters via Rotational Invariance Technique (ESPRIT) may be used.

Figure 3:
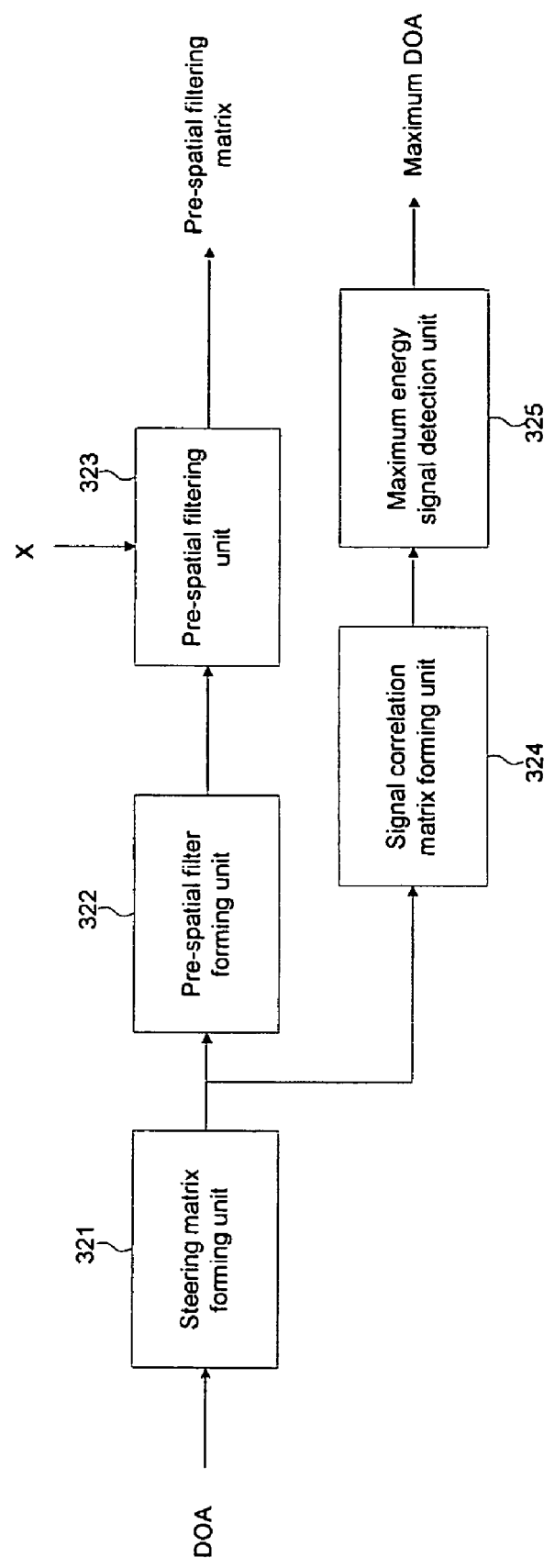
FIG. 3 shows a diagram of a configuration of a pre-spatial filtering unit according to the present invention.

FIG. 3 shows a configuration of the pre-spatial filtering unit 320 according to the embodiment of the present invention. The pre-spatial filtering unit 320 includes a steering matrix forming unit 321, a pre-spatial filter forming unit 322, a pre-spatial filtering operation unit 323, a signal correlation matrix forming unit 324, and a maximum energy signal detection unit 325.

A pre-spatial filtering operation is performed for a data subcarrier matrix X generated by the DFT unit 200 by using the DOAs $\theta_1, \theta_2, \ldots,$ and $\theta_d$ estimated by the DOA estimation unit 310 shown in FIG. 2. The steering matrix forming unit 321 forms a steering matrix A as given as Equation (2) to perform the pre-spatial filtering operation.

$$A = [a(\theta_1) \vdots a(\theta_2) \vdots \ldots \vdots a(\theta_d)] \qquad (2)$$

$a(\theta_i)$ denotes a steering vector corresponding to the DOA $\theta_i$ (here, i = 1, 2, ..., and d), and it is determined by a geometrical configuration of the antenna array. The pre-spatial filter forming unit 322 forms a pre-spatial filter given as Equation (3) for the data subcarrier matrix X allocated to the desired signal by the base station by using the steering matrix A, and the pre-spatial filtering operation unit 323 performs a filtering operation to extract a pre-spatial filtering matrix in step S120.

$$\hat{S} = (A^H A)^{-1} A^H X \qquad (3)$$

Superscript H denotes a Hermitian transpose, and $\hat{S}$ denotes a (d×$N_c$M) pre-spatial filtering matrix, wherein respective rows indicate pre-beamforming outputs.

In addition, the steering matrix A is input to the signal correlation matrix forming unit 324 to output a correlation matrix $R_s$, and the correlation matrix $R_s$ is input to the maximum energy signal detection unit 325 to output a maximum DOA $\theta_{max}$. The output maximum DOA is input to the spatial filtering unit 340, and is used to calculate a beamforming output.

Figure 4:
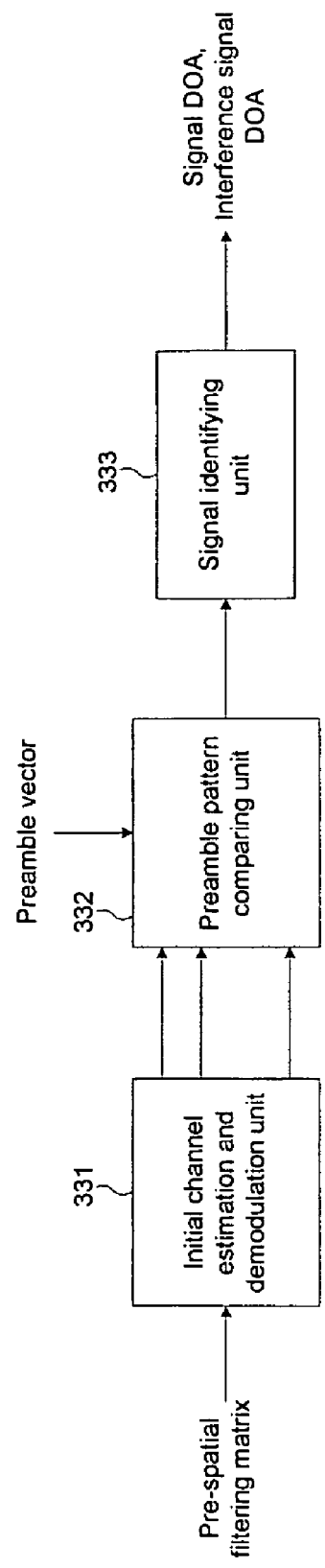
FIG. 4 shows a diagram of a configuration of a signal identification unit according to the present invention.

FIG. 4 shows a configuration of the signal identification unit 330 according to the embodiment of the present invention. The signal identification unit 330 uses a matrix indicating a pre-beam generated in FIG. 3 to identify the desired signal and the interference signal in step S130.

As shown in FIG. 4, the signal identification unit 330 includes an initial channel estimation and demodulation unit 331, a preamble pattern comparing unit 332, and a signal identifying unit 333.

The initial channel estimation and demodulation unit 331 receiving the pre-spatial filtering matrix $\hat{S}$ performs initial channel estimation and coherent demodulation for the pre-beam. Then, signal identification for determining the desired signal or the interference signal is performed by using a plurality of demodulated data sequences. To perform the signal identification, a terminal uses a predetermined preamble pattern transmitted from the controller of the base station.

The signal identifying unit 333 may perform the signal identification after comparing patterns of the data sequence demodulated by the preamble pattern comparing unit 332 and the preamble vector transmitted from the base station controller. When n and d-n respectively denote the number of DOAs of the desired signal and the number of DOAs of the interference signal, the respective DOAs are given as $\theta_{s,1}, \theta_{s,2}, \ldots,$ and $\theta_{s,n}$ and $\theta_{i,1}, \theta_{i,2}, \ldots,$ and $\theta_{d-n}$.

Figure 5:
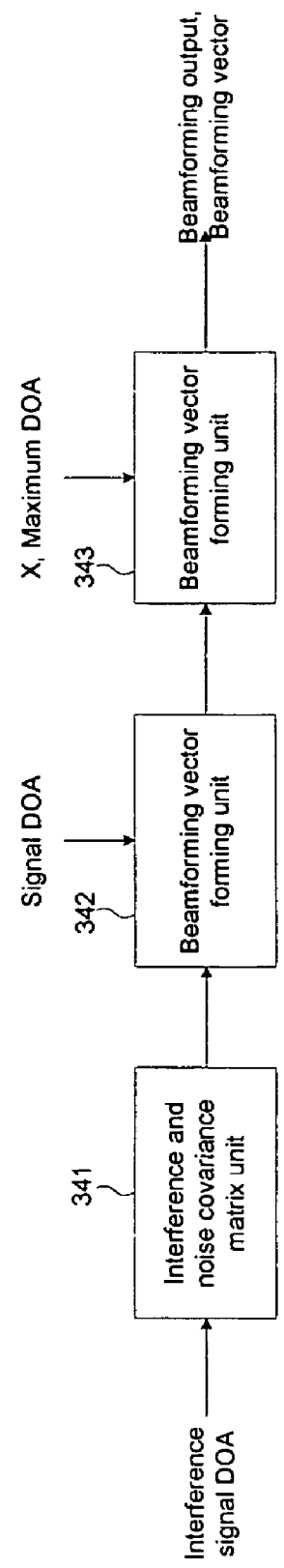
FIG. 5 shows a diagram of a configuration of a spatial filtering unit according to the present invention.
Figure 6:
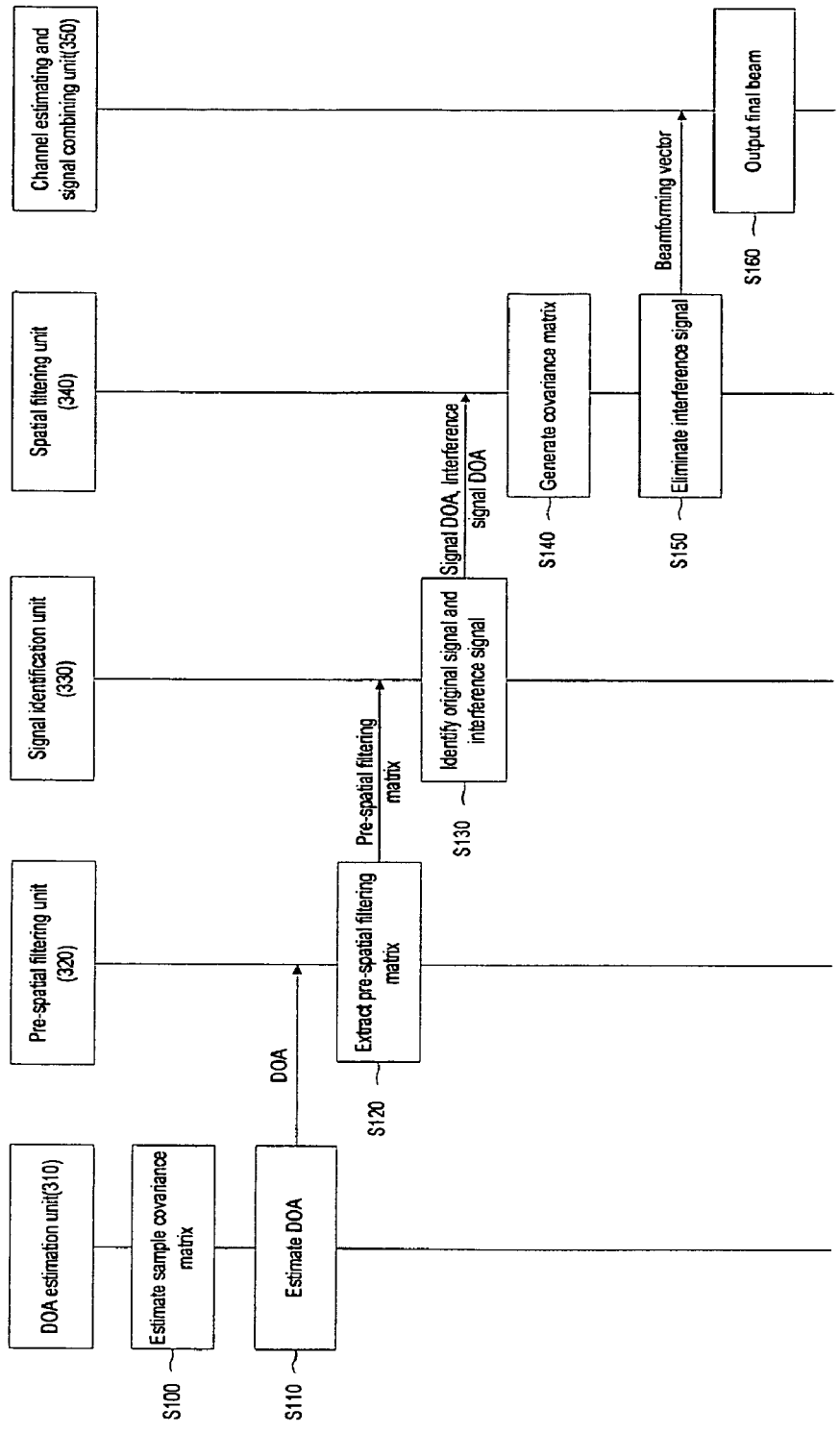
FIG. 6 shows a flowchart representing a beamforming process in a base station of an OFDM communication system according to the present invention.

FIG. 5 shows a configuration of the spatial filtering unit 340 according to the embodiment of the present invention. The spatial filtering unit 340 includes an interference and noise covariance matrix unit 341, a beamforming vector forming unit 342, and a spatial filtering unit 343.

The interference and noise covariance matrix unit 341 uses the DOA $\theta_{i,1}, \theta_{i,2}, \ldots,$ and $\theta_{i,d-n}$ of the interference signal estimated by the signal identifying unit 333 to form the interference-plus-noise covariance matrix $R_u$ as given as Equation (4) in step S140.

$$R_u = \sum_{j=1}^{d-n} \sigma_{i,j}^2 a(\theta_{i,j}) a^H(\theta_{i,j}) + \sigma_n^2 I \qquad (4)$$

$\sigma_n^2$ and $\sigma_{i,j}^2$ respectively denote received power values of the noise and a $j^{th}$ interference signal. It is easier to form the null in an interference signal direction when the power value of the interference signal is set to be greater than the same of the noise by 20 dB or more.

The main beam is formed in the desired signal direction by using the interference-plus-noise covariance matrix, the null is formed in the interference signal direction to eliminate the interference signal in step S150. Accordingly, the beamforming vector forming unit 342 forms n reverse link beamforming vectors as given as Equation (5). In this case, the covariance matrix and the DOA $\theta_{s,1}, \theta_{s,2}, \ldots,$ and $\theta_{s,n}$ of the desired signal output from the signal identification unit 330 are used.

$$\hat{W}_i = \beta_i \hat{R}_u^{-1} a(\theta_{s,i}) \; i=1, 2, \ldots, n \qquad (5)$$

$\beta_i$ denotes a constant, which is set as $\|\hat{W}_i\|^2 = 1$. By using the n estimated reverse link beamforming vector $W_k$, the subcarrier data X, and the maximum DOA output by the maximum energy signal detection unit 325, the spatial filtering unit 343 performs a final beamforming operation to obtain n final beams $r_i$ as given as Equation (6). In addition, a forward link beamforming vector $W_f$ is output.

In a mobile communication system using a Time Division Duplex (TDD) (e.g., a Wireless Broadband system (WiBro)), characteristics of a reverse link and a forward link are similar. Therefore, the beamforming vector $W_f$ obtained in the reverse link may be used in the forward link. That is, $W_f$ obtained as $W_k$ is used as a beamforming vector of the forward link.

$$r_i = \hat{w}_i^H X \; i=1, 2, \ldots, n \qquad (6)$$

In addition, a beamforming vector corresponding to a maximum signal among n reverse link beamforming vectors $\hat{W}_i$ is selected as a forward link beamforming vector, which is given as Equation (7).

$$\hat{W}_f = \hat{W}_{1,max} \qquad (7)$$

The received power value corresponding to the DOA of respective signals is obtained by calculating a signal correlation matrix as given as Equation (8).

$$\hat{R}_s = (A^H A)^{-1} A^H \hat{C}_{XX} A (A^H A)^{-1} \qquad (8)$$
$$= (A^H A)^{-1} A^H (\hat{R}_x - \hat{\sigma}_n^2 I) A (A^H A)^{-1}$$

A noise power value used in Equation (8) is estimated as Equation (9).

$$\hat{\sigma}_n^2 = \frac{1}{m-d} \sum_{i=1}^{m-d} \lambda_i \qquad (9)$$

$\lambda_i$ denotes a noise subspace eigenvalue of the estimated covariance matrix $\hat{R}_x$.

The channel estimating and signal combining unit 350 shown in FIG. 1 estimates respective channels for the n final beam $r_i$ output from the spatial filtering unit 340, performs a maximal ratio combining by using channel response characteristics to perform phase compensation and to obtain diversity, and outputs one final beam in step S160. The signal demodulation unit 360 finally demodulates the combined signal.

According to the embodiment of the present invention, since the base station estimates the DOAs of the desired signal and the interference signal, forms the main beam in the desired signal direction, and forms the null in the interference signal direction, effects of the noise and the interference signal may be minimized.

In addition, a signal interference problem caused when a plurality of cells use the same frequency may be solved, and frequency reuse rate may be increased.

Further, performance of signal identification is improved since a pre-spatial filtering process is provided, and system performance may be improved since the maximal ratio combining is performed after forming the main beam.

The above-described methods and apparatuses are not only realized by the preferred embodiments of the present invention, but, on the contrary, are intended to be realized by a program for realizing functions corresponding to the configuration of the preferred embodiments of the present invention or a recording medium for recording the program.

While this invention has been shown and described with reference to certain preferred embodiments thereof, it is to be understood that the invention is not limited to the disclosed embodiments, but, on the contrary, is intended to cover various modifications and equivalent arrangements included within the spirit and scope of the appended claims.

What is claimed is:

1. A method for forming a beam based on a plurality of signals received through a plurality of antennas in a base station of a communication system, the method comprising:
    processing the plurality of signals to obtain a data subcarrier matrix allocated to at least one desired signal requested by the base station;
    estimating Direction-Of-Arrivals (DOAs) of the plurality of received signals based on the data subcarrier matrix;
    identifying the at least one desired signal and at least one interference signal from the plurality of signals based on the estimated DOA;
    generating an interference-plus-noise covariance matrix by using at least one DOA of the at least one interference signal among the DOAs;
    generating a plurality of beamforming vectors based on the covariance matrix; and
    using the plurality of beamforming vectors to form a plurality of final beams;
    wherein the identifying step further comprises:
        forming a steering matrix based on the DOAs;
        performing a filtering operation for the data subcarrier matrix using the steering matrix to extract a filtering matrix;
        forming a signal correlation matrix from the data subcarrier matrix based on the steering matrix;
        generating a maximum DOA based on the signal correlation matrix;
        comparing patterns of a preamble input to a controller for controlling the base station and a preamble of the filtering matrix to identify the at least one desired signal and the at least one interference signal; and
        estimating at least one DOA of the at least one desired signal and the at least one DOA of the interference signal.

2. The method of claim 1, wherein the generating a plurality of beamforming vectors step further comprises:
    forming at least one main beam in a direction of the at least desired signal by using the covariance matrix; and
    forming null in a direction of the interference signal by using the covariance matrix.

3. The method of claim 1, wherein the estimating DOAs step further comprises:
    estimating a sample covariance matrix based on the data subcarrier matrix; and
    estimating the DOAs of the plurality of signals based on the estimated sample covariance matrix.

4. The method of claim 1, wherein the generating a maximum DOA step further comprises:
    generating the covariance matrix based on the at least one DOA of the at least one interference signal;

forming a reverse link beamforming vector based on the covariance matrix and the at least one DOA of the at least one desired signal; and generating a forward link beamforming vector based on the reverse link beamforming vector, the data subcarrier matrix, and the maximum DOA.

5. The method of claim 1, wherein the communication system uses an Orthogonal Frequency Division Multiplexing (OFDM) method.

6. A device for forming a beam based on a plurality of signals received through a plurality of antennas in a base station of a communication system, the device comprising:

a Direction-Of-Arrival (DOA) estimation unit for estimating DOAs of the plurality of signals based on a data subcarrier matrix obtained from the plurality of signals;

a pre-spatial filtering unit for performing a filtering operation for the data subcarrier matrix to generate a filtering matrix by using the estimated DOAs;

a signal identification unit for identifying at least one desired signal and at least one interference signal from the plurality of received signals by using a data sequence generated by the filtering matrix, and generating the DOA of the at least one desired signal and the DOA of the at least one interference signal from the estimated DOAs;

a spatial filtering unit for generating an interference-plus-noise covariance matrix by using the at least one DOA of the at least one interference signal, eliminating the at least one interference signal by using the covariance matrix and the at least one DOA of at least one the desired signal, and forming a plurality of final beams for the at least one desired signal; and a channel estimating and signal combining unit for performing a maximal ratio combining on outputs according to the plurality of final to generate a combined signal;

wherein the signal identification unit comprises:

an initial channel estimation and demodulation unit for performing channel estimation and coherent demodulation for the filtering matrix;

a preamble pattern comparing unit for comparing patterns of the filtering matrix in which the channel estimation and the coherent demodulation have been performed, by using the data sequence and a preamble vector transmitted from a controller for controlling the base station; and a signal identifying unit for identifying the at least one desired signal and the at least one interference signal from the plurality of received signals by using the data sequence.

7. The device of claim 6, wherein the DOA estimation unit comprises:

a sample covariance matrix estimation unit for estimating a sample covariance matrix from the data subcarrier matrix;

an Eigen decomposition unit for obtaining a combination including an eigenvalue and an eigenvector from the sample covariance matrix;

a received signal number estimation unit for receiving the eigenvalue to output the number of DOAs and noise power from the sample covariance matrix; and a DOA estimating unit for estimating the DOAs of the plurality of signals based on the eigenvector and the number of DOAs.

8. The device of claim 6, wherein the pre-spatial filtering unit comprises:

a steering matrix forming unit for forming a steering matrix from the data subcarrier matrix by using the DOAs;

a pre-spatial filtering operation unit for performing a pre-spatial filtering operation on the data subcarrier matrix by using the steering matrix to output the filtering matrix;

a signal correlation matrix forming unit for receiving the steering matrix to output a correlation matrix; and a maximum energy signal detection unit for receiving the correlation matrix to output a maximum DOA.

9. The device of claim 6, wherein the spatial filtering unit comprises:

an interference and noise covariance matrix unit for generating the interference-plus-noise covariance matrix by using the at least one DOA of the at least one interference signal;

a beamforming vector forming unit for forming at least one main beam in a direction of the at least one desired signal and generating a reverse link beamforming vector, by using the at least one DOA of the at least one desired signal and the covariance matrix; and a spatial filtering unit for forming a plurality of beams and outputting a forward link beamforming vector, by using the reverse link beamforming vector, the data subcarrier matrix, and a maximum DOA.

10. The device of claim 6, further comprising:

a signal demodulation unit for demodulating the combined signal;

a baseband data sample generator for down converting frequencies of the plurality of signals and converting the plurality of signals to digital signals to generate baseband data samples; and a Discrete Fourier Transform (DFT) unit for discrete Fourier transforming the baseband data samples to obtain a plurality of subcarrier data corresponding to the subcarrier data matrix.

11. The device of claim 6, wherein the communication system uses an Orthogonal Frequency Division Multiplexing (OFDM) method.

12. A device for forming a beam based on a plurality of signals received through a plurality of antennas in a base station of a communication system, the device comprising:

means for estimating Direction-Of-Arrivals (DOAs) of the plurality of signals;

means for identifying at least one original signal and at least one interference signal among the plurality of signals;

means for identifying at least one first DOA of the at least one original signal and at least one second DOA of the at least one original signal among the DOAs; and means for forming at least one main beam in a direction of the at least desired signal by using the at least one first DOA and the at least one second DOA;

means for forming null in a direction of the at least one interference signal by using the at least one first DOA and the at least one second DOA; and means for generating an interference-plus-noise covariance matrix by using the at least one second DOA;

wherein the at least one main beam and the null are formed by using the at least one first DOA and the covariance matrix.

* * * * *